T. J. FEGLEY.
SPINDLE BEARING.
APPLICATION FILED SEPT. 15, 1909.
1,020,894.
Patented Mar. 19, 1912.
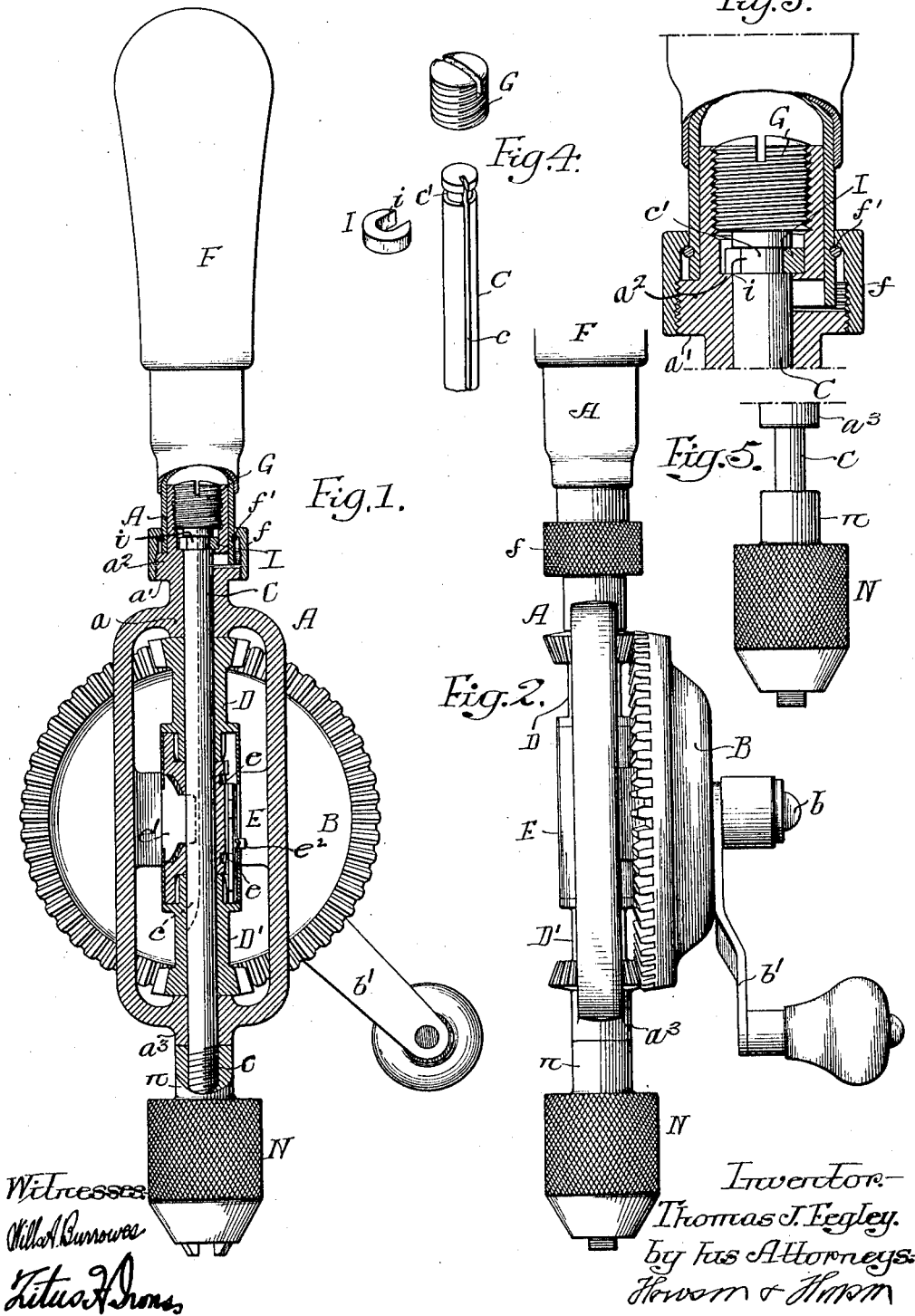

UNITED STATES PATENT OFFICE.

THOMAS J. FEGLEY, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

SPINDLE-BEARING.

1,020,894.        Specification of Letters Patent.       Patented Mar. 19, 1912.

Application filed September 15, 1909. Serial No. 517,819.

*To all whom it may concern:*

Be it known that I, THOMAS J. FEGLEY, a citizen of the United States, residing in Philadelphia, Pennsylvania, have invented certain Improvements in Spindle-Bearings, of which the following is a specification.

The object of my invention is to make a spindle bearing especially adapted to a breast drill and which can be positively held in position and can be readily removed when desired.

In the accompanying drawing:—Figure 1, is a side view of a breast drill, partly in section, illustrating my invention; Fig. 2, is a side view of a breast drill; Fig. 3, is an enlarged view of part of Fig. 1 in section; Fig. 4, is a perspective view of the parts detached; and Fig. 5, is a view of a modification.

A is the frame of a ratchet breast drill, having bearings $a$ and $a^3$ for the spindle C, and projecting from the frame is a stud $b$ on which is a gear wheel B provided with a handle $b'$ by which it is turned.

E is the carrier for the pawls $e$, $e$ of the ratchet mechanism, and $e'$ is a key extending through the carrier and into a longitudinal slot $c$ in the spindle C, so that the spindle will turn with the carrier.

On the spindle C are ratchet wheels D, D', one at each end of the carrier and with which the pawls engage. On each ratchet wheel are beveled pinions, respectively, which mesh with the wheel B. The position of the pawls is controlled by a shifter $e^2$.

In order to hold the spindle C firmly in position and yet allow it to revolve freely in its bearings, I groove the spindle at $c'$ near its inner end, as shown in Fig. 4, and apply a slotted collar I to the spindle; the slot $i$ being of such size as to allow the collar to enter the groove, as shown in Fig. 3. The collar rests on a shoulder $a^2$ in a recess in the extension $a'$ of the bearing $a$ and a hardened screw plug G is screwed into the recess so as to bear against the end of the spindle, thus the spindle is held longitudinally between the shoulder $a^2$ and the plug G. On the opposite end of the spindle is a chuck N and in Fig. 1 the stem $n$ of the chuck is threaded to receive the threaded end of the spindle, and when the chuck is close to the bearing $a^3$, as in Fig. 1, the spindle cannot be removed even if the plug G is detached, but after the chuck N is unscrewed then the spindle can be moved longitudinally until the collar I is beyond the end of the extension $a'$, when it can be removed and the spindle withdrawn in the opposite direction. In some instances the chuck N may be located some distance from the bearing $a^3$, as in Fig. 5, when this construction is used the spindle can be moved longitudinally as soon as the plug G is removed.

F is a detachable handle having a loose screw threaded sleeve $f$, held to the socket end of the handle by a spring ring $f'$ adapted to a groove in the handle and resting under the internal flange of the sleeve. The extension $a'$ fits snugly in the socket end of the handle F and the sleeve is screwed onto the threaded portion of the extension as shown. This construction is illustrated and claimed in an application for patent filed by myself and George O. Leopold on March 2nd, 1909, under Serial Number 480,980.

I claim:—

The combination of a frame having bearings, a spindle mounted in the bearings and having a longitudinal slot and an annular groove near one end, means for turning the spindle, having a key extending into the slot in the spindle, one bearing having a recess, a collar mounted in the recess and extending into the groove of the spindle preventing the spindle moving in one direction, a plug secured to the bearing and resting against the end of the spindle, the key and slot connection allowing the spindle to move longitudinally in the bearings to project the collar so that it can be removed from the spindle, after which the spindle can be withdrawn.

In testimony whereof, I have signed my name to this specification, in the presence of two subscribing witnesses.

THOMAS J. FEGLEY.

Witnesses:
M. ELVA NEVILLE,
HENRY HOWSON.

Copies of this patent may be obtained for five cents each, by addressing the "Commissioner of Patents, Washington, D. C."